United States Patent [19]

Day et al.

[11] Patent Number: 4,923,724
[45] Date of Patent: May 8, 1990

[54] COMPOSITE ARTICLES

[75] Inventors: Gerald F. Day; Frank Robinson; Dennis J. Williams, all of Derbyshire, United Kingdom

[73] Assignee: Courtaulds PLC, London, United Kingdom

[21] Appl. No.: 304,933

[22] Filed: Feb. 1, 1989

Related U.S. Application Data

[63] Continuation of Ser. No. 38,943, Apr. 16, 1987, abandoned.

[30] Foreign Application Priority Data

Apr. 23, 1986 [GB] United Kingdom ............... 09865

[51] Int. Cl.$^5$ .................. D03D 3/02; B29C 67/14
[52] U.S. Cl. .................. 428/36.1; 139/387 R; 264/257; 264/271.1; 428/188
[58] Field of Search .................. 428/188, 36.1; 139/387 R; 264/257, 271.1

[56] References Cited

U.S. PATENT DOCUMENTS 3,953,640 4/1976 Takada .................. 428/188
4,668,545 5/1987 Lowe .................. 428/188

FOREIGN PATENT DOCUMENTS 0116916 2/1983 European Pat. Off. .
440142 12/1935 United Kingdom .
1248936 12/1972 United Kingdom .

Primary Examiner—James Seidleck
Attorney, Agent, or Firm—Davis Hoxie Faithfull & Hapgood

[57] ABSTRACT

A fabric reinforcement for use with synthetic plastics material to produce a composite article is shaped to exhibit a tubular portion having a longitudinal axis, which can be curved, and at least one flange extending in the direction of the longitudinal axis. Using up to several interlinked tubular portions and a plurality of the flanges gives wide possibilities for the shape of the fabric reinforcing elements produced. Woven or knitted fabrics can be used.

11 Claims, 5 Drawing Sheets

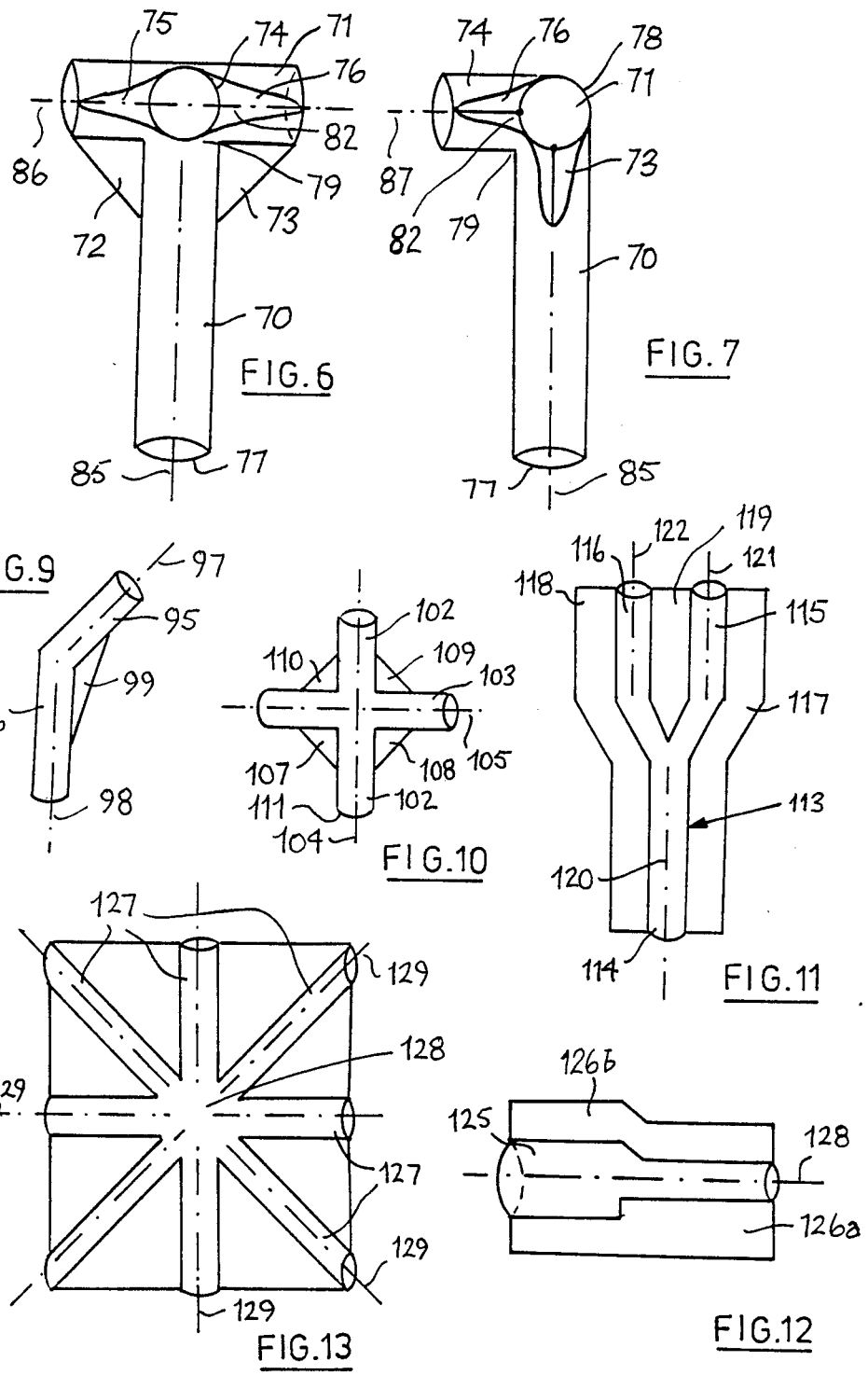

COMPOSITE ARTICLES

This is a continuation of co-pending application Ser. No. 038,943 filed on Apr. 16, 1987 now abandoned.

TECHNICAL FIELD

This invention relates to composite articles and to fabric reinforcement for such articles.

A composite article comprises a reinforcement, normally of a fibrous or filamentary nature, impregnated with, or embedded in, a synthetic plastics material, often a cured synthetic resin.

Woven and knitted fabrics have been used or proposed for such reinfocement. The present invention is based on the discovery of the usefulness of an article comprising a flanged tube in such reinforcements, either in a simple form, or as part of a more elaborate reinforcing element.

SUMMARY OF THE INVENTION

According to the invention, a composite article reinforced with a fabric includes a reinforcing element made from a fabric and comprising a tubular portion having a longitudinal axis, and a flange extending in the direction of the said longitudinal axis.

The longitudinal axis may follow a curve and the flange may be integral with the tubular portion (i.e. part of the same fabric structure).

The reinforcing element may comprise more than one tubular portion and at least one flange integral with two tubular portions and extending in the direction of the longitudinal axis of one tubular portion and in the direction of the longitudinal axis of the other tubular portion.

The invention includes a reinforcing element for use in a composite article according to the invention.

BRIEF DESCRIPTION OF THE DRAWINGS

The invention will be further described, by way of example, with reference to the accompanying drawings in which:

FIGS. 2 to 13 show more elaborate forms of reinforcing elements according to the invention, FIG. 6 being a front elevation and FIG. 7 a side elevation of the same reinforcing element.

DESCRIPTION OF PREFERRED EMBODIMENTS

The reinforcing elements shown in FIGS. 1 to 13 may be knitted on a weft knitting machine having two opposed arrays of individually controllable needles, for example a flat V-bed knitting machine. It is preferable, and in the case of some of the reinforcing elements essential, to use a weft knitting machine in which the arrangements for removing knitted fabric from the needles allow knitting to continue on some needles whilst loops are held on adjacent, inactive needles. One example of such a knitting machine is a flat V-bed knitting machine fitted with a pressure foot.

Figure 1:
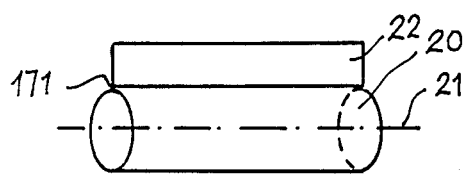
FIG. 1 shows a simple form of reinforcing element for a composite article according to the invention.

The reinforcing element shown in FIG. 1 comprises a tubular portion 20, with a longitudinal axis 21, and a flange 22 knitted integrally with the tubular portion 20. The flange 22 extends from the tubular portion 20 which has a circular cross-section. The flange 22 is flat and lies in a plane containing the longitudinal axis 21 and radii of the tubular portion 20. The flange 22, of course extends in the direction of the longitudinal axis 21, that is along the length of the tubular portion 20.

The reinforcing element of FIG. 1 may be knitted in the direction along the axis of its tubular portion 20 or in the direction at right angles to that. The flange 22 may be knitted as a flat piece of fabric or it may be knitted as a tube which will normally be flattened in the process of using the reinforcing element to make a composite element.

Figure 14:
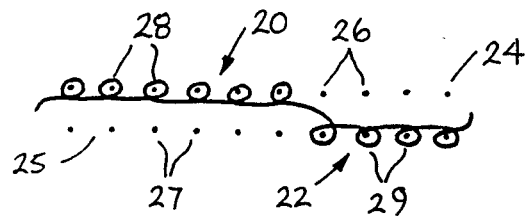
FIGS. 14 and 15 illustrate the knitting of successive courses in the manufacture of a reinforcing element for use in a composite article according to the invention.
Figure 15:
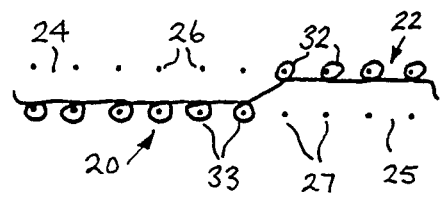

In knitting the reinforcing element of FIG. 1 in the direction along the tubular portion 20, the procedure illustrated in FIGS. 14 and 15 may be used. Those Figures illustrate the formation of successive knitted courses in knitting the reinforcing element of FIG. 1. The procedure may be carried out on a flat V-bed knitting machine with opposed needle beds 24 and 25, shown only diagrammatically in FIG. 14, and respectively containing needles 26 and 27.

The course of knitting shown in FIG. 14 is knitted in the direction from left to right in that Figure and initially in this course, loops 28 of the tubular portion 20 are formed on needles 26 of the rear needle bed 24. At the point of transition from the tubular portion 20 to the flange 22, loop formation is switched to the front needle bed 25 and loops 29 of the flange 22 are knitted to the end of the course. In the next traverse of the cam box of the machine, from right to left (FIG. 15), the next course is formed beginning, using the same yarn, with loops 32 of the flange 22 which is formed on needles 26 of the rear needle bed 24. At the point of transition between the flange 22 and the tubular portion 20, knitting is switched to needles 27 of the front needle bed 25 to form loops 33 of the tubular portion 20. The next course is a repeat of the first course using always the same yarn and the result is the formation of two conjoined tubes, one constituting the tubular portion 20 and the other the flange 22. It is clear that there is a connection comprising filamentary material which is continuous through the junction between the tubular portion 20 and the flange 22. That is, the reinforcing filamentary material (in this case the yarn) is continuous through the junction.

Figure 16:
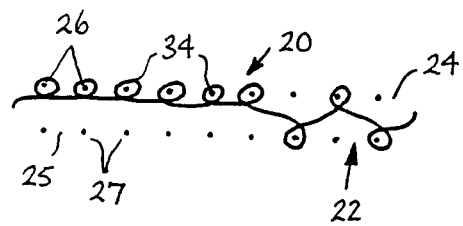
FIGS. 16 and 17 illustrate the knitting of successive courses of another reinforcing element for use in a composite article according to the invention.
Figure 17:
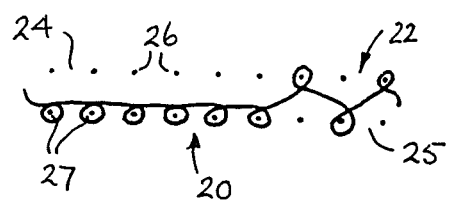

The procedure for knitting an alternative form of the reinforcing element shown in FIG. 1 is illustrated in FIGS. 16 and 17. This procedure is also carried out on a flat V-bed knitting machine with front and rear needle beds 24 and 25 and needles 26 and 27. In the left to right traverse of the needle beds by the cam box (FIG. 16) loops 34 of the tubular portion 20 are formed on needles 26 of the rear bed 24. The part of this course which constitutes part of the flange 22 is formed by knitting alternate stitches on alternate needles 26 of the rear needle bed 24 and alternate needles 27 of the front needle bed 25. In the next course (from right to left) alternate stitches of the flange 22 are again knitted on needles of the front needle bed 25 and needles of the rear needle bed 24 but the needles used for this purpose in this course are those which were inactive in knitting stitches of the flange 22 in the previous course. The flange is thus formed in an interlock structure which is approximately in balance, as to production rate, and thus with respect to overall length of fabric produced, with the tubular structure of the tubular portion 20.

It is desirable that the flange 22 and the tubular portion 20 should be knitted in structures which have approximately the same production rate, otherwise special steps have to be taken to knit additional courses in the one produced at the lower rate.

In one method of using the reinforcing element of FIG. 1 in making a composite article, a cylindrical former is introduced into the tubular portion 20 of the reinforcing element to maintain it in a tubular configuration with a circular cross section. The flange 22 is constrained to adopt the attitude desired in the composite article (and in the case of a tubular flange 22 this will normally mean that it must be flattened); the reinforcing element is then impregnated with a sufficient quantity of synthetic resin to stiffen it and the resin is cured or partly cured, if necessary. The reinforcing element, stiffened with synthetic resin, may then be removed from the former and subsequently impregnated with or embedded in a further synthetic resin which may be the same as or compatible with the first mentioned synthetic resin. The further synthetic resin is then cured, if necessary.

It may be possible to introduce the final resin in the initial process stage described above instead of employing a two-stage resin impregnation process.

The knitted fabric of the tubular portion 20 is desirably placed under a degree of tension by the former introduced into it to ensure that it is stretched to its proper tubular configuration.

The reinforcing element of FIG. 1 can be modified by knitting it with two diametrically opposed flanges, that is, flanges extending in different directions away from the tubular portion 20, using techniques similar to those described above. The tubular portion may also be made conical in shape. This may be achieved by progressively increasing inwardly at the two diametrically opposed junctions of the tubular portion and the flanges, the number of needles knitting the flange structures so that the two flanges become wider and the tubular portion becomes narrower. In the reinforcing element of FIG. 2, each of the flanges 37 and 38 has parallel sides although the tubular portion 39 is a frustum of a cone. This can be achieved by transferring outer edge stitches of each flange 37 or 38 inwardly at the same time as, and in balance with, the inward extension of the flange structure on each side of the tubular portion. The overall number of needles knitting thus decreases and the overall width of the reinforcing element is decreased. Alternatively, the reinforcing element can be knitted in the opposite direction which will involve outward extension of the tubular portion as the knitting progresses and overall widening of the reinforcing element by the inclusion of new stitches at the outer edge of each flange.

Figure 2:
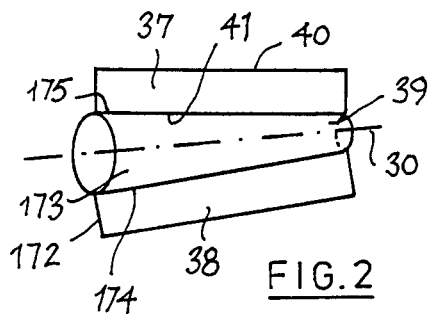

Instead of knitting the reinforcing elements of FIGS. 1 and 2 in the direction along the axis of the tubular portion, these reinforcing elements can be knitted in the direction at right angles to that. In such a procedure, knitting may be begun, referring to FIG. 2, along the outer edge 40 of the flange 37, for example in a 1 x 1 rib structure. At the junction line 41 with the tubular portion 39, knitting continues to form separate fabrics (the opposite side walls of the tubular portion) in single jersey, one on each of the opposed needle beds of a flat V-bed knitting machine. When the knitting of the tubular portion 39 has been completed, the flange 38 is knitted in a desired structure. To shape the tubular portion 39, segment knitting may be used. That is, initially, long courses may be formed extending the full length of the tubular portion 39 and then the courses may be progressively shorted to produced the tubular shape shown in FIG. 2.

There are a number of possible variations of this procedure. For example, longer courses may be interposed between successive ones of progressively shorter shaping courses. Or knitting of the tubular portion 39 may be begun with short courses and progressively longer courses may be knitted, followed by a number of long courses all of the same length, before the course length is progressively decreased again. This procedure results in a knitted structure which is symmetrical about the longitudinal axis 30 of the tubular portion 39.

In order to obtain a balance in the relaxed width of the tubular portion 39 and the flanges 37, 38 when different stitch structures are used in knitting those parts, it may be necessary to employ a different stitch length when knitting the tubular portion and when knitting the flanges.

Figure 3:
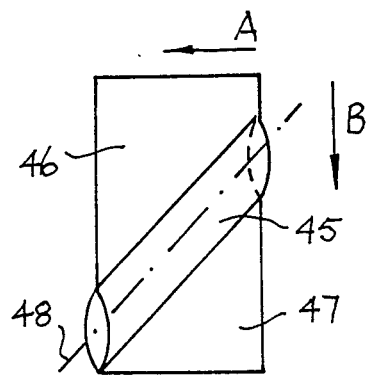

The reinforcing element of FIG. 3 may be knitted so that courses extend either in the direction of the arrow A or in the direction of the arrow B in that Figure. Whichever direction of knitting is chosen, the diagonal inclination of the tubular portion 45 in relation to the flanges 46 and 47 is achieved by controlling the needles of the knitting machine so as to shift the location of the transition between the structure of the flange 46 or 47 and the structure of the tubular portion 45 continuously as the knitting progresses. Both flanges 46 and 47 lie in a plane containing the longitudinal axis 48 of the tubular portion 45.

Figure 4:
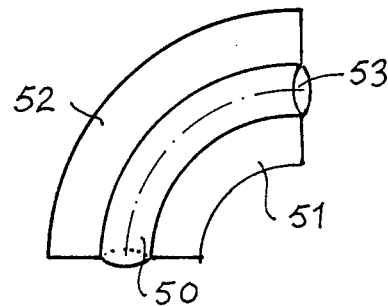

FIG. 4 illustrates a reinforcing element comprising a curved tubular portion 50 carrying two diametrically opposed flanges 51 and 52. This reinforcing element is knitted, like that of FIG. 3 by continuously changing, during the knitting procedure, the points of transition between the flange structure and the structure of the tubular portion. If the flange structure used is a tubular structure the transition between flange and tubular portion is marked by crossing-over of yarn from knitting on one needle bed to knitting on the other. If the flange structure is a double bed structure (such as interlock) the transition is marked by a change from the double bed structure to knitting of a separate fabric on each of the two opposed needle beds.

In FIG. 4, the tubular portion 50 curves through a right angle and thus the progressive movement of the transition points between flange structure and the structure of the tubular portion results eventually in a change from knitting the tubular portion 50 in a vertical orientation to knitting it in a horizontal orientation The tubular portion 50 of the reinforcing element of FIG. 4 has a curved longitudinal axis 53 and each of the flanges 51 and 52 extends in the direction of this axis and lies in a plane containing the axis. The reinforcing elements of FIGS. 2, 3 and 4 may be knitted so that each of the flanges 37, 46 and 52 lies (when flattened) in a plane which is different from the plane of the respective other flange 38, 47 and 51.

Figure 5:
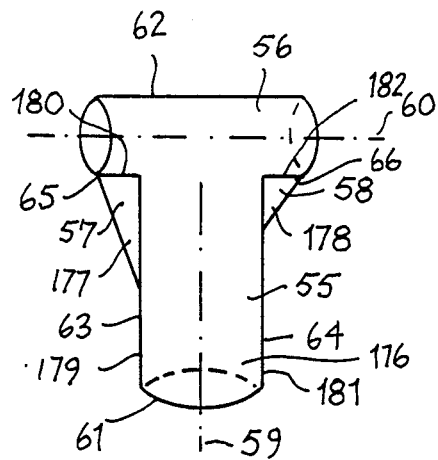

The reinforcing element of FIG. 5 comprises a T-shaped element comprising two intersecting tubular portions constituted by a tubular portion 55 forming the stem of the T and a tubular portion 56 forming the cross member of the T. The tubular portions 55 and 56 are integral parts of a single knitted structure as are flanges 57 and 58 which interconnect the tubular portions 55 and 56. The flanges 57 and 58 extend in the direction of the longitudinal axis 59 of the tubular portion 55 as well as in the direction of the longitudinal axis 60 of the tubular portion 56 and both lie in a plane containing the tubular axes 59 and 60.

One method of knitting the reinforcing element of FIG. 5 is to commence knitting at the free end 61 of the tubular portion 55. At an appropriate time in the knitting of the tubular portion 55, the knitting of the flanges 57 and 58 is introduced and knitting is continued to the end of the tubular portion 55 and the flanges 57 and 58 thus ensuring that the filamentary material forming the fabric is continuous throughout the fabric and particularly through the junctions between the tubular portions 55 and 56, and between the tubular portions 55 and 56 and the flanges 57 and 58. The knitting of the tubular portion 56 proceeds by the formation of separate single jersey fabrics, one on each of the two opposed needle beds. To complete the tubular portion 56, the separate fabrics are joined by a course of double bed knitting along the line 62 and a few further courses may be knitted to reduce the risk of unravelling after casting off.

The flanges 57 and 58 may be knitted in a double bed structure, for example interlock, but advantageously they are knitted as extensions of the tubular portion 55 so that over at least part of each flange 57 or 58 the boundary between the flange and the tubular portion is indistinguishable, and thus, in its uppermost region at least, the tubular portion 55 is part of a larger tube which also incorporates the uppermost regions of the flanges 57 and 58. Knitting of the tubular portion 56 can then be begun merely by carrying on from knitting this larger tube and knitting two separate fabrics on the two opposed needle beds.

The flanges 57 and 58 may be of the same size or have different sizes as shown in FIG. 5.

It may be desirable to mark the transition from the tubular portion 55 into the flanges 57 and 58, at least in the lower regions of the flanges, by interconnecting the fabrics on the opposed needle beds along the lines 63 and 64 at diametrically opposed edges of the tubular portion 55. This may be achieved by interconnecting the two fabrics along these lines by knitted loops or tuck loops formed by yarn extending between the two needle beds. A similar procedure may be followed in forming the transition between the flanges 57 and 58 and the tubular portion 56 so that the outer regions of the flanges 57 and 58 and the outer undersides of the tubular portion 56 are connected by yarn extending between loops formed on needles of the opposed needle beds, the connections lying along the lines 65 and 66.

To make a composite article from a reinforcing element as shown in FIG. 5, formers may be introduced into the tubular portions 55 and 56 before application of resin in a manner described above. A cylindrical former may be introduced into the tubular portion 56 and another cylindrical former may be introduced into the tubular portion 55, preferably to an extent such that there remains a gap between the two formers at the top of the tubular portion 55. That is, the cylindrical former introduced into the tubular portion 55 is not pushed completely to the top of the tubular portion 55.

Advantageously, the cylindrical formers are slightly larger than the relaxed sizes of the tubular portions 55 and 56 respectively so that the knitted fabric of each tubular portion is slightly stretched by the introduction of the respective cylindrical former. The knitted fabric in each of the flanges 57 and 58 is thus also placed under tension and since it is unsupported, adopts a shape such that the fabric is in a state of minimum energy. That is, the loop structure of each flange 57 or 58 adjusts itself so that the potential energy represented by the stretch energy of the fabric is a minimum for the particular combination of tubular portions and cylindrical formers chosen. This entails that the tension in each fabric and in each loop of each fabric is also at a minimum. It is believed that by allowing the fabric of each flange portion 57 or 58 to adopt the free, unsupported shape which it assumes naturally, the strength which the reinforcing fabric lends to the join between the tubular portions 55 and 56 is enhanced. The shape of each flange portion 57 or 58 is in fact that of an anticlastic surface and each flange portion is thus represented by a minimum energy anticlastic surface.

The tubular portions 55 and 56 need not be of the same diameter, as shown in FIG. 5. They may be of different diameters and even of different cross-sectional shapes. For example, the tubular portion 55 may be knitted so that its diameter is less than that of the tubular portion 56 and an appropriately smaller diameter cylindrical former may be introduced into it. Alternatively, a former of another cross-section, for example a square cross-section may be introduced into one or both of the tubular portions 55 and 56. Thus, for example, a T-shaped composite article having a square section stem (55) and a circular section cross-piece (56) may be produced.

The reinforcing element shown in FIGS. 6 and 7 comprises intersecting tubular portions constituted by a tubular stem 70 and a tubular cross-piece 71 integrally knitted with the stem 70 and which intersect in a common junction region. The reinforcing element includes flanges 72 and 73 which are integral with and thus interconnect the stem 70 and cross-piece 71. Additionally, the reinforcing element of FIGS. 6 and 7 has a further intersecting tubular portion 74 which extends from the cross-piece 71 at right angles to the stem 70 and the cross-piece 71 and which is knitted integrally with the stem and cross-piece and intersects both of them in a common junction piece. The connection between the tubular portion 74 and the cross-piece 71 is strengthened by flanges 75 and 76 which are integral with and interconnect the two.

To make the reinforcing element of FIGS. 6 and 7, knitting may be started at the lower end 77 of the stem 70 which is knitted in the form of a tube in the upwards direction from the end 77 on opposed needle beds, for example of a flat V-bed knitting machine, until the start of the flanges 72 and 73 is reached. The flanges 72 and 73 are then knitted together with the upper part of the stem 70, in the manner described above in relation to the flanges 57 and 58 of the reinforcing element of FIG. 5. flanges 72 and 73 of hollow form being shown in FIGS. 6 and 7. When knitting of the stem 70 and the flanges 72 and 73 is completed, knitting of the cross-piece 71 is begun in extension of the stem 70 and flanges 72 and 73. The cross-piece 71 is knitted, like the tubular portion 56 of FIG. 5, by forming separate fabrics, one on one bed of the knitting machine and one on the other and constituting front and rear tube walls of the cross-piece. In knitting the cross-piece 71, preparation must be made for knitting the tubular portion 74 and for ensuring that it will extend at right angles (or approximately at right angles) to the stem 70, out of the plane of the paper in FIG. 6. To achieve this, more courses of the cross-piece are knitted on the rear needle bed of the knitting machine, producing the region 78 of the tube wall of the cross-piece 71, than are knitted on the front needle bed, producing the region 79 of the tube wall of the cross-piece 71. In the present instance, the rate of course formation on the rear needle bed is arranged to be three times that of the rate of course formation on the front needle bed and thus three times as many knitted courses are introduced into the region 78 as into the region 79. If it is desired to have the cross-piece 74 inclined at some angle to the stem 70 which is different from 90°, then an appropriate adjustment must be made in the ratio between the courses formed in the regions 78 and 79.

When sufficient courses in the regions 78 and 79, taken together, have been knitted to produce the required diameter of tube for the cross-piece 71, knitting of the flanges 75 and 76 and the tubular portion 74 is begun. The flanges 75 and 76 may be knitted in the same structure as the flanges 72 and 73 or in a different structure.

It is also possible to modify the angle at which the tubular portion 74 lies in relation to the crosspiece 71 and this involves a procedure such as the following. After completing the knitting of the crosspiece 71, knitting of the tubular portions 74, 75 and 76 employs the use of U-shaped courses of varying length prior to the commencement of circular courses for these portions. The U-shaped courses may increase in length progressively or the knitting of portions 74, 75 and 76 may each be commenced with an initial long U-shaped course followed by progressively shorter U-shaped courses finally followed by the introduction of circular courses. Thus a reinforcing element is produced having tubular portions with longitudinal axes extending in planes lying at an angle to one another.

If a hollow form is chosen for the flanges 75 and 76 (as shown in the Figures), then the change (in each course) from knitting the cross-piece 71 to knitting the flanges 75 and 76 and the tubular portion 74 is marked by a change from knitting separate fabrics by supplying separate yarns to the needles of the two needles beds to knitting a single tubular fabric constituting the flanges 75 and 76 and the tubular portion 74. As explained above in relation to the reinforcing element of FIG. 5, the opposed side walls of the flanges 75 and 76 may be connected by means of knitted or tucked stitches formed between them, across the opposed needles beds, the line of such stitches extending along the center line 82 of the front side wall of the crosspiece 71.

As knitting of the tubular portion 74 proceeds, the tubular diameter originally knitted is progressively narrowed so that the width of the flanges 75 and 76 is progressively reduced until the diameter of the tube being knitted corresponds to that required in the tubular portion 74. Again, the opposite side walls of each flange 75 and 76 may be connected by knitted or tucked along the center line of the associated side wall of the tubular portion 75. Opposite side walls of the flange portions 72 and 73 may be interconnected in a similar way.

The flanges 72, 73, 75 and 76 may alternatively be knitted in two-bed structures. Each flange extends longitudinally of two of the tubular portions of the reinforcing element (the stem 70 and cross-piece 71 constituting tubular portions as well as the longitudinal portion 74). Each flange or the central plane of each flange, also lies in a plane containing the longitudinal axes 85, 86 or 87 of two of the tubular portions 70, 71 or 74.

In making the reinforcing element of FIGS. 6 and 7 into a composite article, formers having desired cross-sectional shapes are introduced into the stem 70, cross-piece 71 and tubular portion 74 to stretch the knitted fabric and cause the fabric of the flanges 72, 73, 75 and 76 (when of hollow configuration) to adopt a minimum energy and minimum tension configuration as described above in relation to the flange portions 57 and 58 of the reinforcing element of FIG. 5.

The reinforcing elements of FIGS. 8 to 13 are knitted using, in general, techniques similar to those already described above and they can be made into composite articles in ways similar to those described above. Their formation will be described briefly below with emphasis on any aspects of the techniques used which have not been described above.

Figure 8:
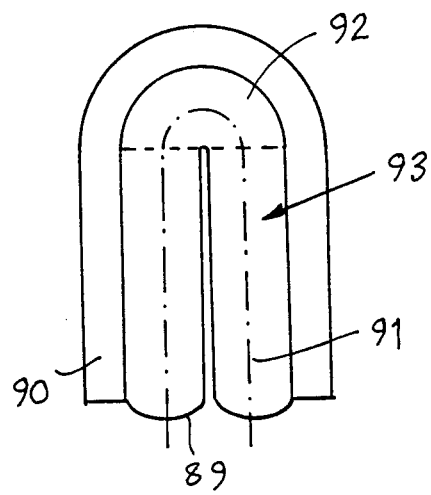

The reinforcing element of FIG. 8 has a tubular portion 89 and a flange 90. It may be knitted in the direction along the longitudinal axis 91 of the tubular portion 90, the 180° curve 92 in the tubular portion 90 being achieved by using segmental knitting, similar to the technique used in forming heel pouches in socks and as described above in relation to FIG. 4. The flange 90 lies (when flat), or its central plane lies, in the plane of the longitudinal axis 91 and extends in the direction of the longitudinal axis 91. Of course the longitudinal axis need not lie in a single plane. For example, the part 92 of the tubular portion 89 may be lifted up out of the plane of the paper in FIG. 8 so that it lies at an angle to the part 93 of the tubular portion 89.

The reinforcing element of FIG. 9 comprises two intersecting tubular portions 95 and 96 having longitudinal axes 97 and 98 disposed in a single plane so that the included angle between them is obtuse and interconnected by a flange 99 knitted integrally with them. The flange 99 (if flat) lies in the same plane as the longitudinal axes 97 and 98 and extends (whether flat or hollow) in the direction of those axes.

The reinforcing element of FIG. 10 is in the form of a tubular cross strengthened with flanges. The tubular portions 102 and 103 intersect in a common junction region, the arrangement being such that sections of the tubular portions radiate from a hub. The tubular portions 102 and 103 have longitudinal axes 104 and 105 and are interconnected by four flanges 107, 108 109 and 110 integral with the tubular portions and lying (if flat) in the same plane as the axes 104 and 105 and extending in the directions of those axes. This reinforcing element may be knitted starting at the lower end 111 of the tubular portion 102 and proceeding upwards knitting the tubular portion 102 initially in the form of a tube, introducing the flange structures 107 and 108, then knitting distinct fabrics on opposed needle beds to form the tubular portions 103, knitting on into the upper part of the tubular portion 102 and the flanges 109 and 110 and finally completing the tubular portion 102 by knitting the upper end of this portion as a tube.

FIG. 11 shows a reinforcing element having a bifurcated tubular portion 113 with a lower part 114 and two upper parts 115 and 116 The outer flanges 117 and 118 and a flange 119 lying between and interconnecting the parts 115 and 116 serve to strengthen the reinforcing element and extend in the direction of the longitudinal axes 120, 121 and 122 of the parts 114, 115 and 116 of the tubular portion 113.

In the reinforcing element of FIG. 12, the tubular portion 125 is shaped during the knitting procedure and has parts of different diameter. Diametrically oppositely located flanges 126a and 126b extend in the direction of the longitudinal axis 128 of the tubular portion 125 and the flange 126b is shaped to follow the outer contour of the adjacent edge of the tubular portion 125.

The reinforcing element of FIG. 13 is in the form of a plurality of tubular portions 127 radiating from a hub 128 and interconnected by flanges lying (if flat) in the plane of the longitudinal axes 129 of the tubular portions and extending (whether flat or hollow) in the direction of those axes.

Reinforcing elements according to the invention may also be formed from warp knitted and woven fabrics or from non-woven fabrics, if a tubular portion of the fabric and an integral flange are formed by cutting suitably shaped pieces from the fabric and sewing or otherwise securing them together.

Instead of using a single jersey structure for the tubular portions it is possible to use a cross float or a cross-tuck fabric or structure to make the tubular portions and/or the flanges if these are in tubular form. If the flanges are knitted as flat fabric in interlock structure it may be desirable, in order to balance the production rate of the interlock fabric and the cross float or cross-tuck fabric, to introduce additional courses in the latter fabric compared with the interlock fabric.

Figure 18:
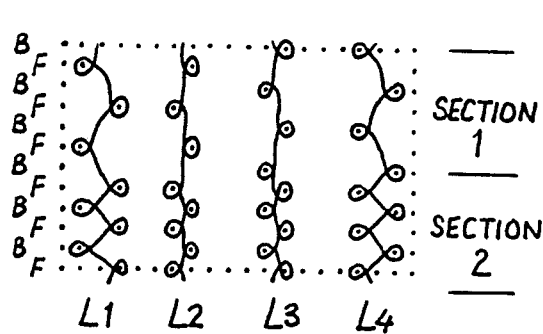
FIGS. 18 and 19 are a lapping diagram and a schematic cross-section through a warp knitted fabric suitable for providing a reinforcing element for a composite material according to the invention.
Figure 19:
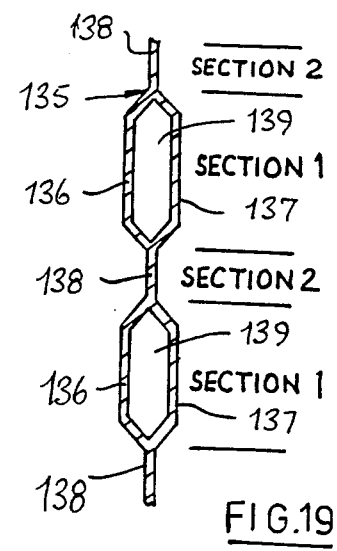

FIGS. 18 and 19 illustrate how a fabric suitable for providing composite reinforcement according to the invention may be warp knitted. The knitting is carried out on a twin needle bar Raschel warp knitting machine using four guide bars L1 to L4 which are all fully threaded. Alternate horizontal lines of points in FIG. 18 represent the knitting action on the front needle bed (F) and the back needle bed (B) of the machine respectively. The pattern repeat of the fabric 135 (FIG. 19) comprises two sections (FIG. 18). In Section 1 guide bars L1 and L2 supply yarn exclusively to the front needle bed and guide bars L3 and L4 supply yarn exclusively to the back needle bed. Thus two separate face fabrics 136 and 137 are formed, one on each needle bed in a locknit construction. In Section 2 of the fabric 135, all four guide bars supply yarn to both needle beds and thus a single thickness of fabric 138 is formed, the two pairs of guide bars L1, L2 and L3, L4 moving in anti-phase so that the yarns knit on the two needle beds alternately. The result (if the Sections 1 and 2 are repeated as shown in FIG. 19) is the fabric 135 shown (in horizontal diagrammatic cross-section) in that Figure. This fabric comprises two tubular portions 139 and three flanges constituted by the pieces of fabric 138. Clearly by choosing to knit only one Section 1 and one Section 2 a reinforcement similar to that shown in FIG. 1 can be produced. By knitting two comparatively large Sections 2, and a single Section 1 and cutting the resultant fabric, a reinforcement similar to that shown in FIG. 3 can be produced.

Figure 20:
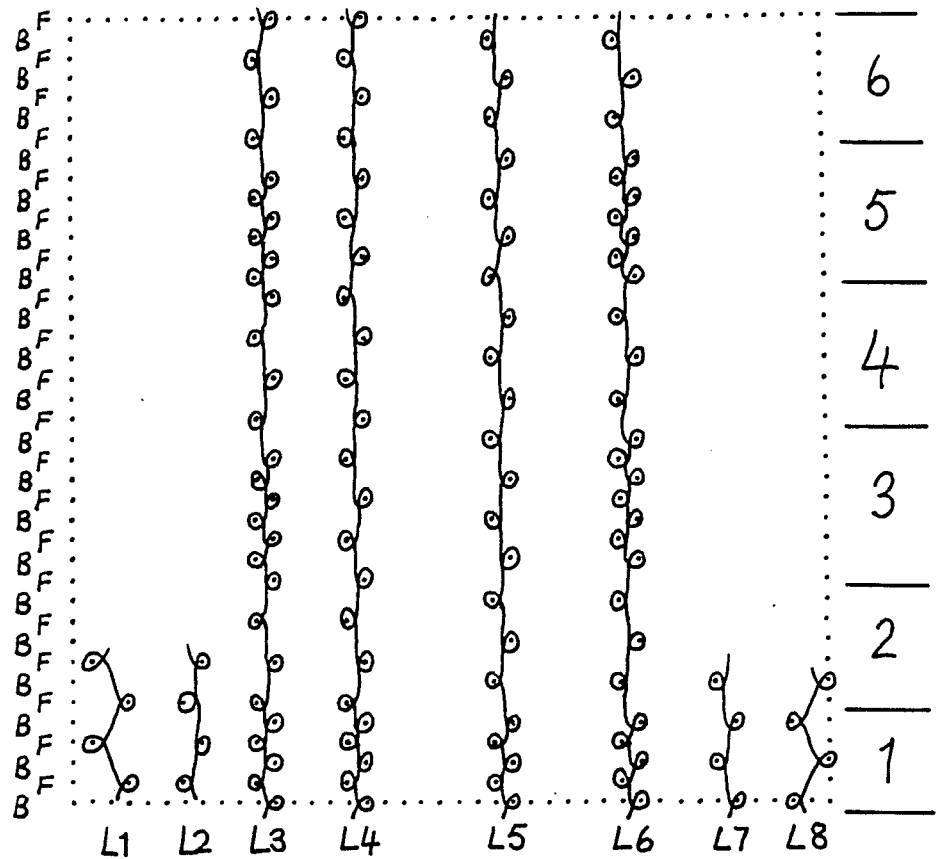
FIGS. 20 and 21 are drawings similar to FIGS. 18 and 19 in respect of another warp knitted fabric for use in the invention.
Figure 21:
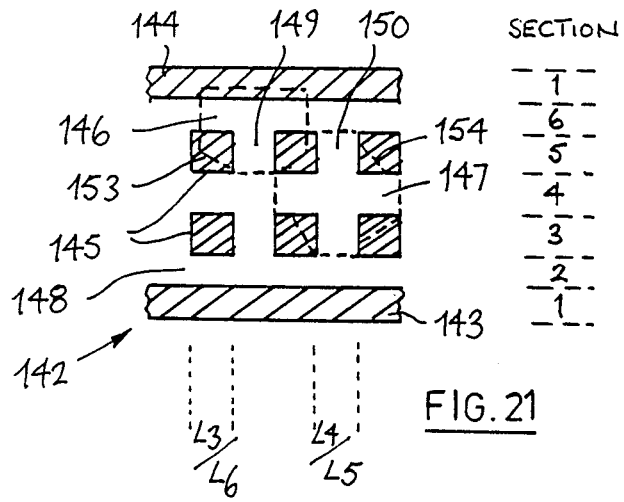

Knitting in accordance with the lapping diagram of FIG. 20 produces the fabric schematically illustrated in FIG. 21 using the following threading sequence for eight guide bars L1 to L8.
L1: fully set
L2: fully set
L3: thread 12, miss 12 and repeat
L4: miss 12, thread 12 and repeat
L5: miss 12, thread 12 and repeat
L6: thread 12, miss 12 and repeat
L7: fully set
L8: fully set The fabric 142 of FIG. 21 is produced on a twin needle bar Raschel warp knitting machine. The guide bars L1 and L2 knit together on the front needle bed to produce a locknit face fabric and the guide bars L7 and L8 also knit together on the back needle bed to produce a locknit face fabric. In the lapping diagram, FIG. 20, only a few courses are shown for guide bars L1, L2, L7 and L8 since they repeat the same movements throughout the knitting of the fabric 142. The remaining guide bars supply yarns which engage in the knitting action so as to join the two face fabrics together in selected regions. In FIG. 21, these regions are indicated by diagonal shading and comprise edge regions 143 and 144 spaced in the longitudinal direction of the fabric and areas 145 in the fabric.

The guide bars L3 and L6 with the threading set out above initially knit, together with the guide bars L4 and L5, on both needle beds of the machine throughout Section 1. Yarns from the four guide bars L3 to L6 together, therefore, provide the connection between the face fabrics in the edge region 143. The guide bar L4 thereafter supplies yarn only to the front needle bed throughout the knitting of the fabric 142 until the edge region 144 is reached when the guide bar L4 again knits on both needle beds to make its contribution to the connection of the face fabrics in this region. One part of the fabric in which yarns from the guide bars L4 and L5 are present and form a connection between the face fabrics or are embodied in the face fabrics (leaving the face fabrics separate from one another in these regions) is indicated by the broken lines and the designation L4/L5 in FIG. 21. One part of the fabric 142 where yarns from the guide bars L3 and L6 are present is indicated by broken lines and the designation L3/L6. As shown in FIG. 20, guide bars L3 and L6 knit alternately on the two needle beds in Sections 1, 3, 4 and 5 of the fabric and thus connect the face fabrics together in these Sections. However, because these guide bars are only part threaded the connection is only effected in the spaced areas 145 (and in the edge regions 143 and 144 where yarns from the guide bars L4 and L5 complete the connection).

The resulting fabric 142 comprises parts constituted by edge regions 143, 144 and areas 145 where, in fact, the fabric comprises a single sheet of material and parts (the unshaded areas in FIG. 21) where the fabric comprises two face fabrics. The piece of fabric shown thus comprises horizontal tubular portions 146, 147 and 148 and vertical tubular portions 149 and 150 and flanges constituted by the edge regions 143 and 144 and the areas 145 with filamentary material forming the fabric continuous between the tubular portion and flanges, as a consequence of the fabric structure.

By altering the threading of the guide bars and the pattern repeat, the dimensions of the tubular portion 146 to 150 and the parts constituting integral flanges can be altered. Thus by omitting the areas 145, and narrowing the edge region 143, a reinforcing element similar to that shown in FIG. 1 can be produced. If the areas 145 are omitted and the edge regions 143 and 144 are considerably enlarged, a piece of fabric can be produced from which a reinforcing element similar to that shown in FIG. 3 can be made. A reinforcing element similar to that shown in FIG. 5 can be produced by cutting the piece of fabric 142 around the broken line 153 in FIG. 21. Cutting around the broken line 154 will produce a reinforcing element similar to that shown in FIG. 10.

Figure 22:
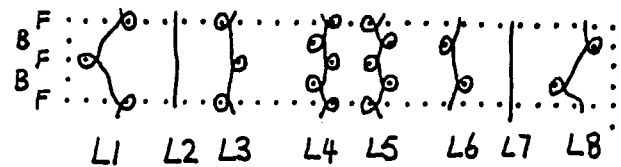
FIGS. 22 and 23 are drawings similar to FIGS. 18 and 19 in respect of a third warp knitted fabric for use in the invention.
Figure 23:
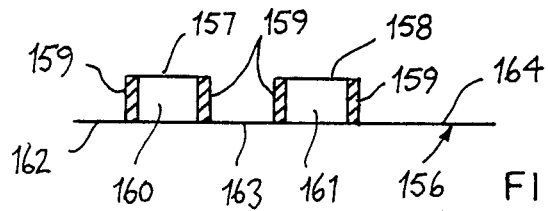

Knitting on a twin needle bed Raschel warp knitting machine according to the lapping diagram of FIG. 22 using eight guide bars L1 to L8 threaded as shown below produces a fabric having the structure diagrammatically indicated in FIG. 23 (a cross-section through the fabric). The threading set-up is as follows:

L1: fully set
L2: fully set
L3: fully set
L4: thread 4, miss 4
L5: thread 4, miss 4
L6: thread 12, miss 4
L7: thread 12, miss 4
L8: thread 12, miss 4

The guide bars L1 and L3 supply yarn exclusively to the front needle bed to form a locknit face fabric 156 with yarns longitudinally laid in by the guide bar L2. The guide bars L6, L7 and L8 supply yarn exclusively to the rear needle bed to produce locknit face fabrics 157 and 158 shown in FIG. 23. These fabrics 157 and 158 are connected to the face fabric 156 by yarns supplied from guide bars L4 and L5 which knit continuously on front and back needle beds alternately and form connecting regions 159.

The resulting fabric comprises tubular portions 160 and 161 extending longitudinally in the fabric and flanges 162, 163 and 164 integral with the tubular portions. This fabric can be used to make reinforcing elements similar to those which can be derived from the fabric 135 of FIG. 19.

Figure 24:
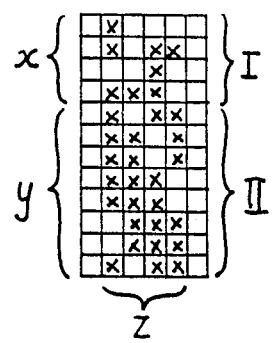
FIGS. 24 and 25 are a design and draft for use in weaving a fabric for use in the invention.
Figure 25:
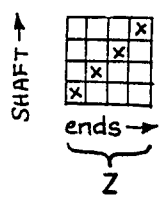

Weaving instructions to produce a woven fabric for a reinforcing element according to the invention are shown in FIGS. 24 and 25. FIG. 24 is a conventional design plan for a fabric shown on squared paper and each cross indicates that a weft insertion passes below the warp end represented by the column in which the cross is inserted. The draft (FIG. 25) is also a conventional diagram and from the design and draft can be constructed a peg plan for setting up the loom.

Section I of the design of FIG. 24 in fact represents instructions for weaving a double fabric, that is two separate fabrics, both in plain weave, alternate weft picks entering alternate fabrics. Section II of the design represents instructions for weaving a single sheet of fabric, all the warp ends combining in this section so as to be enmeshed in this single sheet of fabric. As indicated in FIGS. 24 and 25, Sections I and II may be repeated x times and y times respectively and the pattern may be repeated in the direction across the warp z times. By adjusting the values of x, y, and z and repeating the structure as necessary, if required with different values of x and y, a fabric can be produced which in some regions comprises a single sheet of material and in other regions comprises two face fabrics which, in these other regions, are separate from one another. If a region corresponding to Section II of FIG. 24 is woven to precede the region corresponding to Section I in FIG. 24, that is the two-fabric region of Section I is bounded on its upper and lower edges by single-sheet regions like Section II, a fabric comprising a tubular portion (Section I) having two integral flanges (Section II) is produced and, of course, filaments constituting the fabric are continuous through the junctions between the flanges and tubular portion. By cutting one flange away almost entirely or weaving one flange so that it is much wider than the other, a reinforcing element similar to that shown in FIG. 1 can be produced. By weaving comparatively large flanges before and after a tubular portion, the fabric can be cut to produce a reinforcing element as shown in FIG. 3.

Figure 26:
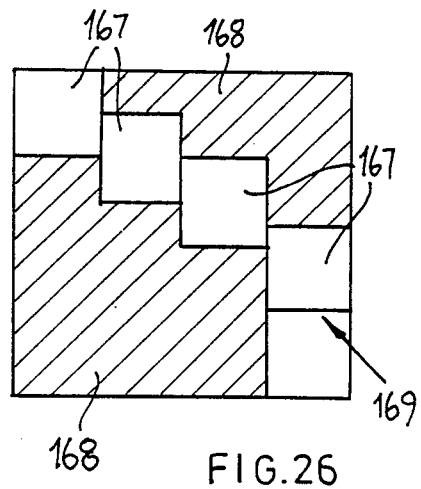
FIG. 26 is a diagrammatic representation of a woven fabric for use in the invention.

If a jacquard loom is used, the position of the two-fabric regions like Section I constituting the tubular portions can be shifted in the longitudinal direction of the fabric as one proceeds across the fabric. In FIG. 26, the two-fabric regions are shown by the unshaded areas 167 and the shaded areas 168 are constituted by a single sheet of material. FIG. 26 thus shows a fabric incorporating a tubular portion 169 which follows a curve and is similar to the reinforcing element of FIG. 4 with the constraint that weaving will always produce a stepped edge to the line of the curve even if, in practice, the steps can be made quite small.

Using the design shown in FIG. 24 as a basis and the technique discussed in relation to FIG. 26 of locating the two-fabric regions of the overall fabric at different longitudinal positions as the design is repeated across the fabric, reinforcing elements according to any of FIGS. 1 to 5 and 8 to 13 can be produced although in some cases it will be necessary to cut the reinforcing element out of a larger piece of fabric.

In the reinforcing elements described with reference to FIGS. 18 to 26 each tubular portion has a longitudinal axis (that is an axis extending in the length direction of the tubular portion) and a flange extends in the direction of the said longitudinal axis.

Each reinforcing element shown in FIGS. 1 to 13 can be made up from one or more flat sheets of fabric by sewing or otherwise securing a sheet of fabric to itself or to one or more other sheets of fabric. The fabric used may be weft or warp knitted, woven or nonwoven. Thus, the reinforcing element of FIG. 1 can be formed from a rectangular piece of fabric one edge of which is folded over and fastened back to the main part of the fabric sheet along the line 171. The reinforcing element of FIG. 2 can be made by cutting a piece of fabric 172 and a further tapering piece of fabric 173 and fastening the two together along the lines 174 and 175. Alternatively, a single piece of fabric can be folded over on itself and the two adjacent sheets secured to one another along the lines 174 and 175. In such made-up reinforcing elements, filamentary material forming the fabric or fabrics involved is continuous through the flange-tubular portion and through the tubular portion junctions.

The reinforcing element shown in FIG. 5 can be made by cutting out a cruciform piece of fabric 176, folding it over on itself and joining its edges together and connecting in flanges 177 and 178 along the lines 179, 180, 181 and 182. The remaining reinforcing elements shown in FIGS. 1 to 13 can be made in a similar way. In the case of the reinforcing element of FIGS. 6 and 7, the basic T-shape is made as just described in relation to FIG. 5 and the additional tubular portion 74 and its associated flanges are then secured in place. The flanges of reinforcing elements produced by making-up techniques may be of tubular form as described above in relation to the production of the reinforcing forcing elements of FIGS. 1 to 13 by weft knitting.

Further, when producing reinforcing elements by warp knitting or weaving, flanges can be made in tubular form and flattened if necessary in the subsequent procedure of using the reinforcing elements to make composite articles.

The reinforcing elements described with reference to FIGS. 19 to 26 may be used in the same way as those described with reference to FIGS. 1 to 18.

It is advantageous, as already explained in relation to weft knitted reinforcing elements according to FIGS. 1 to 13, to stretch and tension the fabric of the tubular portion or portions of any reinforcing element according to the invention before applying resin to the reinforcing element. This may be done by introducing a former of desired cross-sectional shape into the tubular portion, the former having dimensions slightly larger than the relaxed dimensions of the tubular portion. In particular, if a reinforcing element has a flange or flanges of tubular configuration connecting tubular portions lying at an angle to one another it is advantageous to stretch the reinforcing element, before applying resin to it, in such a way that the fabric in the flange or flanges adopts a configuration corresponding to a minimum energy, minimum tension surface.

In relation to the warp knitted and woven fabrics described above, the production of reinforcing blanks has been described by cutting out from a piece of the fabric a desired shape for the reinforcing element. It is also possible to produce a piece of weft knitted fabric having a pattern capable of being used as a precursor for one or more reinforced elements which can subsequently be cut from it.

U-shaped courses can be used in a similar way to that described above to achieve an angle different from a right angle between the tubular portion 55 and the tubular portions 56 and FIG. 5. In this case the U-shaped courses will, in knitting the tubular portion 55 in the upward direction, be knitted at the upper end of that portion, that is before the knitting of the portions 56 is commenced.

Any of the conventionally available filamentary materials including glass, carbon, graphite, boron, silicon carbide and high performance aromatic polymers (such as the material known under the Trade Mark "Kevlar") can be used for knitting or weaving the reinforcing elements described herein.

What is claimed is:

1. A composite article comprising a synthetic plastics material reinforced with a fabric reinforcing element, said reinforcing element comprising (a) at least three tubular portions each of which has a longitudinal axis, said tubular portions intersecting at a common junction such that said longitudinal axes extend in planes lying at an angle to one another, and (b) flanges interconnecting the tubular portions each of said flanges lying in a plane containing the longitudinal axes of the tubular portions interconnected thereby and extending in the direction of said longitudinal axes, said tubular portions and flanges comprising an integrally knitted fabric element.

2. A composite article as claim in claim 1 in which the longitudinal axes of the tubular portions of the fabric reinforcing element extend in planes which lie at angles to one another of substantially 90°.

3. A composite article as claim in claim 1 in which the flanges of the fabric reinforcing element are of at least partly hollow form.

4. A composite article as claimed in claim 1 in which the fabric reinforcing element comprises a weft knitted fabric.

5. A composite article as claim in claim 4 in which the flanges of the fabric reinforcing element comprise weft knitted fabric formed in a double bed structure.

6. A composite article as claimed in claim 1 in which at least two of the intersecting tubular portions of the fabric reinforcing element have different cross-sectional shapes from each other.

7. A composite article as claimed in claim 1 in which a flange of the fabric reinforcing element has the shape of a minimum energy anticlastic surface.

8. A process for making a composite article as claimed in claim 1 comprising taking a knitted fabric reinforcing element of the structure specified in claim 1, inserting a former into each of the intersecting tubular portions thereof, impregnating the reinforcing element with a synthetic resin to stiffen it, at least partly curing the synthetic resin if necessary, and removing the formers from the tubular portions.

9. A process as claimed in claim 8 in which a tubular portion is stretched by the insertion of a former which is slightly larger than the relaxed size of the tubular portion.

10. A process as claimed in claim 9 in which two intersecting tubular portions are stretched by the insertion of formers thereby tensioning the flange interconnecting them into the shape of a minimum energy anticlastic surface.

11. A process as claimed in claim 8 in which, after removal of the former, the composite article is impregnated or embedded in a further synthetic resin which is the same as or is compatible with the synthetic resin with which the fabric reinforcing element has already been impregnated and this further synthetic resin is cured if necessary.

* * * * *

UNITED STATES PATENT AND TRADEMARK OFFICE
CERTIFICATE OF CORRECTION

PATENT NO. : 4,923,724

DATED : May 8, 1990

INVENTOR(S) : Gerald F. Day; Frank Robinson

It is certified that error appears in the above-identified patent and that said Letters Patent is hereby corrected as shown below:

Col. 8, line 5, "along" should be --loops--;

Col. 13, line 4, delete "forcing";

Col. 14, line 51, "former" should be --formers--;

Col. 14, lines 13, 17, and 23, change "claim", first occurrence, to --claimed--;

Signed and Sealed this

Twenty-eighth Day of April, 1992

Attest:

HARRY F. MANBECK, JR.

Attesting Officer

Commissioner of Patents and Trademarks